(12) United States Patent
Parihar et al.

(10) Patent No.: US 10,051,497 B1
(45) Date of Patent: Aug. 14, 2018

(54) OPTIMIZING A RELAY ANTENNA IN A COMMUNICATIONS NETWORK

(71) Applicant: Sprint Communications Company L.P., Overland Park, KS (US)

(72) Inventors: Vanil Parihar, Overland Park, KS (US); Amrit Kumar Chandra, Ashburn, VA (US); Jay Ronald Chernoff, Purcellville, VA (US); Kristian Kai Johns, Ashburn, VA (US); Charles Anthony Manganiello, Paola, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/654,358

(22) Filed: Jul. 19, 2017

(51) Int. Cl.
| | | |
|---|---|---|
| *H04B 7/15* | (2006.01) |
| *H01Q 3/02* | (2006.01) |
| *H04W 24/02* | (2009.01) |
| *H04W 16/18* | (2009.01) |
| *H04W 16/28* | (2009.01) |
| *H01Q 1/24* | (2006.01) |
| *H01Q 1/12* | (2006.01) |

(52) U.S. Cl.
CPC ......... *H04W 24/02* (2013.01); *H01Q 1/1257* (2013.01); *H01Q 1/246* (2013.01); *H04W 16/18* (2013.01); *H04W 16/28* (2013.01)

(58) Field of Classification Search
CPC ...... H04B 7/15; H04B 7/155; H04B 7/15507; H01Q 3/12; H01Q 3/26; H01Q 21/30; H01Q 3/00; H01Q 3/005; H01Q 3/02; H01Q 3/04
See application file for complete search history.

(56) References Cited

U.S. PATENT DOCUMENTS

| | | | | |
|---|---|---|---|---|
| 7,577,398 | B2 * | 8/2009 | Judd | G01S 19/25 342/357.48 |
| 2011/0305175 | A1 * | 12/2011 | Hethuin | H01Q 1/125 370/310 |
| 2015/0031345 | A1 * | 1/2015 | Hyde | H01Q 1/241 455/418 |
| 2015/0236429 | A1 * | 8/2015 | Tanabe | H01Q 19/185 455/73 |
| 2015/0295328 | A1 * | 10/2015 | Fireaizen | H01Q 3/12 342/370 |
| 2017/0301987 | A1 * | 10/2017 | Mack | H01Q 3/02 |

FOREIGN PATENT DOCUMENTS

KR 101795313 B1 * 11/2017 ............... H01Q 3/02

* cited by examiner

Primary Examiner — Blane Jackson

(57) ABSTRACT

Systems and methods are provided for optimizing a relay node in a wireless communication network. A plurality of base stations may be provided as well as at least one antenna at a relay node, the antenna operably coupled to a rotation mechanism. The plurality of base stations can be scanned by the antenna, the scanning using one or more control parameters dictating a portion of a scanning process. Based on the scanning, an optimal base station may be determined and/or an optimal antenna position may be determined. The antenna can adjust to the optimal position and/or can attach to the optimal base station to provide an optimal backhaul link.

20 Claims, 6 Drawing Sheets

OPTIMIZING A RELAY ANTENNA IN A COMMUNICATIONS NETWORK

TECHNICAL FIELD

The field of the technology described herein relates to relay node and relay antennas in wireless communications networks.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in determining the scope of the claimed subject matter.

In brief, and at a high level, embodiments of the technology described herein are directed to, among other things, systems and methods for optimizing relay antennas and relay nodes in communications networks, such as wireless communications networks or relay networks. For example, embodiments disclosed herein may incorporate control mechanisms into antenna design such that an antenna at a relay node may be optimally positioned in a relay network or connected to an optimal base station. Accordingly, optimized relay nodes may provide enhanced coverage, capacity, and connectivity for the relay network. In some aspects of the technology described herein, a deployment plan of a relay network includes providing a plurality of base stations and one or more relay nodes. Relay nodes can include one or more antennas or antenna systems. Further a relay network can include a plurality of user devices. Functionally, relay nodes can act as intermediaries between a base station and a user device. In order to maintain a certain level of connectivity, antennas at a relay node can periodically scan a number of base stations in a given sector to identify an optimal base station to link to. There are, however, inefficiencies in conventional approaches to implementing relay antennas. For example, difficulties arise in the ability to scan the maximum coverage area in a short amount of time. Those antennas that are able to scan a greater coverage area ultimately take a longer time. Alternatively, those antennas that can complete a scan in less time ultimately are not able to scan the greatest coverage area, for example in instances where pole shadowing is an issue.

BRIEF DESCRIPTION OF THE DRAWINGS

Aspects of the present technology is described in detail herein with reference to the attached figures, which are intended to be exemplary and non-limiting in nature, wherein.

DETAILED DESCRIPTION

Figure 1:
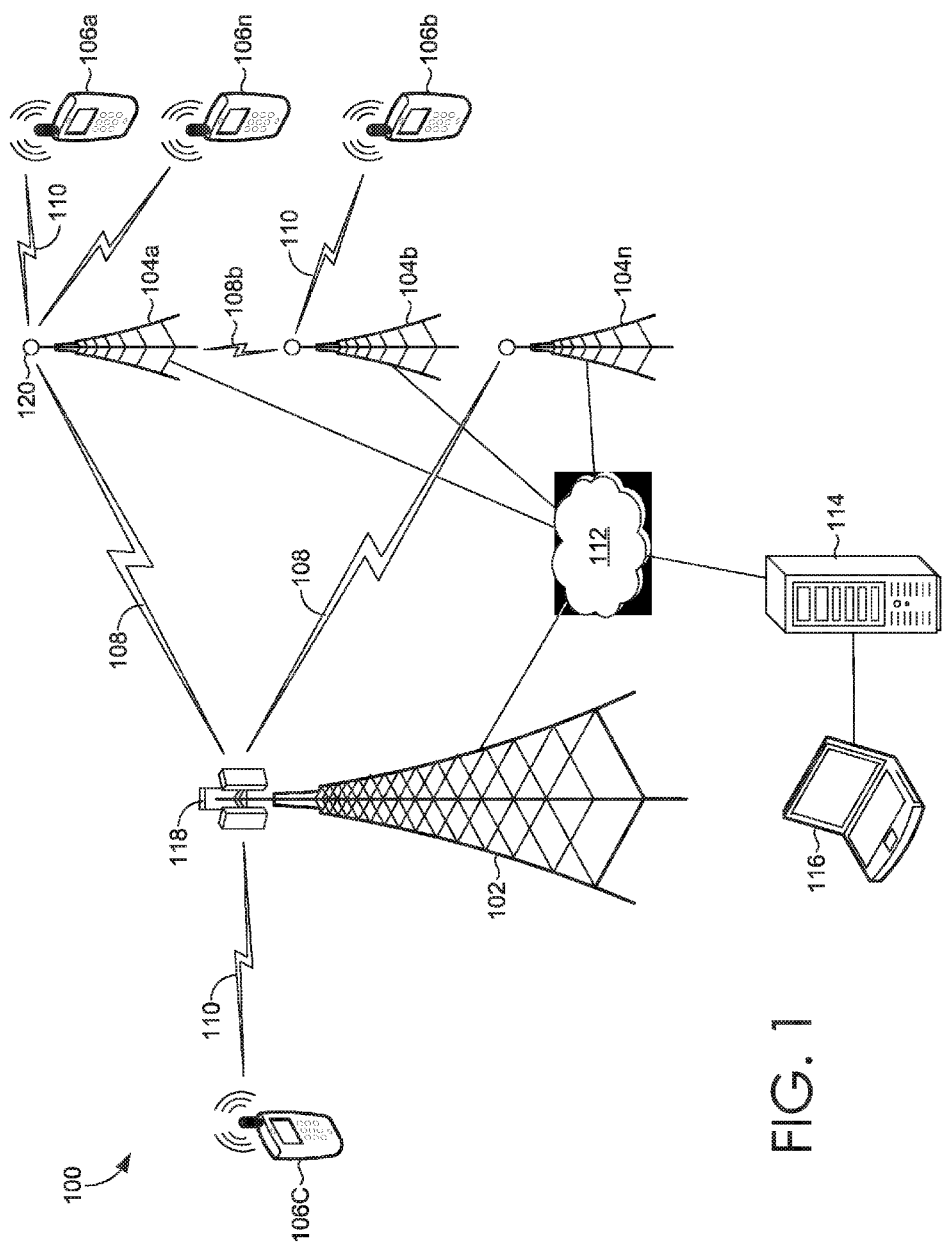
FIG. 1 is a diagram of an example network environment including a relay node, in accordance with some embodiments of the present disclosure.

The subject matter of the present technology is described in this disclosure to meet statutory requirements. However, the description is not intended to limit the scope of the invention. Rather, the claimed subject matter may be embodied in other ways, to include different steps, combinations of steps, features, or combinations of features, similar to the ones described in this disclosure, and in conjunction with other present or future technologies. Moreover, although the terms "step" and/or "block" may be used to identify different elements of methods employed, the terms should not be interpreted as implying any particular order among or between various steps or blocks unless and except when the order of individual steps or blocks is explicitly described and required.

Throughout this disclosure, several acronyms and shorthand notations may be used to aid the understanding of certain concepts pertaining to associated networks and systems, services, and devices. The acronyms and shorthand notations are intended to help provide an easy methodology of communicating the idea expressed herein and re not meant to be limiting in scope. Further various technical terms are used throughout this description. An illustrative resource that provides various aspects of these terms can be found in Newton's Telecom Dictionary, 27th Edition, 2012.

The term "transmitting/receiving component" as used herein may include any antenna, antenna system, antenna configuration or other component configured to broadcast and/or receive a wireless communications signal over a network to communicate with a mobile communication device. A "transmitting/receiving component" or "communication component" may further refer to an element associated with a base station, relay node, or user equipment that transmits and receives signals. The term "relay node" as used herein may include any base station, access point, access node, or small cell in a network to which a mobile communication device may attach to connect to a wireless communication network. In some instances a "relay node" may be a single relay antenna or assembly, or a collection of relay antennas. The terms "macro cell," "base station," "base station receiver," "access point," and "access component" may be used interchangeably in this description. The terms "user device," "user equipment," "mobile device," "mobile handset," and "mobile transmitting element" may be used interchangeably in this description. In relating these elements, one or more base stations and mobile devices may be paired for uplink and downlink transmission for communication or exchange of radio frequency (RF) transmissions over a network. The terms "Attach/Detach" may be used interchangeably with "connect/disconnect", "link/unlink" or any other appropriate terms describing connections or signal transfers between any combination of base stations, relay nodes, and user equipment.

According to aspects of the technology described herein, a relay node (e.g. small cell) can be provided to a communications network, such as a radio access network, wherein the relay node incorporates at least one antenna, such as a relay antenna. The relay node can be coupled to a rotation mechanism or rotatable device, such as a rotatable motor, in order to provide a control mechanism. Utilizing the control mechanism the relay node is configured to adjust the antenna based one any number of control parameters. In some aspects, the antenna can be rotated via the control mechanism so as to re-position or re-align the antenna. In a relay network, a relay antenna can scan one or more scanning areas in search of one or more base stations (e.g. macro cells, eNodeB elements) to connect or attach to. The connection between a relay node and a base station can be referred to as a backhaul link. In an optimized relay network, the relay node can attach to the best base station based on its scan. For example, the antenna can scan a 360° area to find the best base station to connect to. During a scan, the antenna can take measurements of a plurality of base stations by attaching and detaching to each one and creating a list of possible base stations to connect to. After completing a scan the antenna can then connect to the optimal base station based on the measurements and created list. In this way, based on the scanning, the antenna can determine an optimal backhaul link within the communications network.

According to further aspects of the technology described herein, a method for providing an optimized relay node in wireless communications networks is provided. The network can be implemented as, for example, user equipment (UE) relay network. Accordingly, a plurality of base station elements (e.g. macro cell, eNodeB) can be provided. A relay node can be provided to the network, the relay node having at least one transmitting/receiving component, such as an antenna (e.g. a switched beam antenna). The antenna can be communicatively to a rotatable motor so as to provide a rotational element to the antenna to enhance the scanning and positioning capabilities of the antenna. Utilizing the rotation mechanism, the antenna can scan a scanning area to determine an optimal base station to connect to from the plurality of base stations. Once an optimal base station is determined, the antenna can create a communications link between itself and the base station. The scanning operations of the antenna may be based on any number of scanning parameters, for instance antenna beamwidth, rotation angle increment, and/or rotational steps. Given an antenna beamwidth, which can be determined based on the antenna design, a rotation angle increment and a number of rotational steps can be calculated and used by a relay node to adjust the antenna, via the rotation mechanism, during the scanning of the scan area. As such, the plurality of base stations can be scanned based on a determined number of rotational steps for the antenna, thus enabling the antenna to scan an area greater than its beamwidth.

According to even further aspects of the technology described herein, a method for optimizing a relay node in a wireless communications network, such as a relay network, is provided. The communications network can include a plurality of base station elements (e.g. macro cell, eNodeB) and a relay node, the relay node including at least one antenna having at least one beam (e.g. a switched beam antenna) that can be communicatively coupled to a rotatable motor. Based on the design of the antenna, the at least one be can have a given beam width. From the beamwidth, a rotation angle increment can be determined or calculated for the antenna. Based on the determined rotation angle increment determined for the antenna, a number of rotational steps can be determined for the antenna as well. The beamwidth, rotation angle increment, and the rotational steps can be referred to as scanning parameters. Based on the scanning parameters the antenna can scan for at least one base station of the plurality of base stations in the network. In some implementations, using the scanning parameters, the antenna can scan a subset of the plurality of base stations. During the scanning, the antenna can take measurements of the base stations, for example by connecting to and then disconnecting from a base station. Based on the scanning, the antenna can build a list of base stations measured to then determine the best, or optimal, base station to connect and/or link to. Once the scanning parameters are determined, the scanning process can be initiated. Starting at a first position, the antenna can scan a first beam area by electronically switching to take measurements of any number of base stations within the beam area. Once the scan of the first beam area is complete, the antenna can be rotated to a second position via the rotatable motor. The rotation of the antenna will be dictated by the scanning parameters, such as the rotation angle increment. The antenna can then scan a second beam area by electronically switching at the second position. Once the scan of the second beam area is complete the antenna can be rotated to a third position via the rotatable motor. The antenna can then scan a third beam area by electronically switching at the third position. It will be appreciated that the number of positions and beam areas (e.g. scanning areas) will be dictated by the scanning parameters, such as the number of rotational steps. After the scanning is complete, the antenna can be rotated back to its initial position. Based on the scanning, an optimal base station from the plurality of base stations can be determined. The determination of the optimal base station can be derived from a measurement list compiled during the scanning procedures.

Referring now to the drawings in more detail, and initially to FIG. 1, a network diagram 100 including at least one base station 102 and at least one relay node 104a, 104b, 104n is depicted in accordance with embodiments of the technology described herein. The base station 102 and any one of the relay nodes 104a, 104b, 104n can be connected to server 114 and/or a computing device 116 via a network 112. While FIG. 1 only depicts one computing device 116 and one server 114, aspects of the present technology contemplate that a computing device and/or server can be configured as multiple local devices operating together or one or more remotely hosted devices, or a combination comprising at least one of the foregoing. The base station 102 comprises at least one transmitting/receiving component, such as antenna 118 to enable communication with one or more relay nodes 104a, 104b, 104n and/or one or more user devices 106c. The relay node 104a, 104b, 104n comprises at least one transmitting/receiving component, such as antenna 118 to enable communication with the base station 102 and/or at least one user device 106a, 106b.

The base station 102 can include a transmitting/receiving component 118 or multiple transmitting/receiving components arranged as one or more arrays. The transmitting receiving component 118 can allow operable communication with one or more relays nodes 104a, 104b, 104n and or any number of user devices 106c over a range of frequencies. The relay nodes 104a, 104b, 104n can include one transmitting/receiving component 120 or multiple transmitting/receiving components arranged as an array which can communicate with the base station 102 or multiple user devices 106a, 106b, 106n, over a range of frequencies. These transmitting/receiving components may be antennas, more specifically RF transmitters/receivers, and can cover individual or overlapping broadcast ranges.

The network 100 can be configured to facilitate communication (e.g. via RF signals) amongst one or more base stations 102, relay nodes 104a, 104b, 104n, and user devices 106a, 106b, 106c, 106n. In various combinations of the foregoing, the network can be referred to as a UE relay network. In one aspect, a base station 102 can be in operable communication with a user device 106c via access link 110. In some instances the radio interface between the base station 102 and the user device 106c (e.g., UE) can be a Uu interface. In another aspect, any one relay node 104a, 104b, 104n can be in operable communication with a user device 106a, 106b, 106n (e.g. UE) via access link 110, which can be provided as a Uu interface. In yet another aspect, a base station 102 can be in operable communication with any relay node 104a, 104b, 104n via a relay or backhaul link 108. In some instances the radio interface between base station 102 and relay node 104a, 104b, 104n can be provided as a Un interface.

Figure 2:
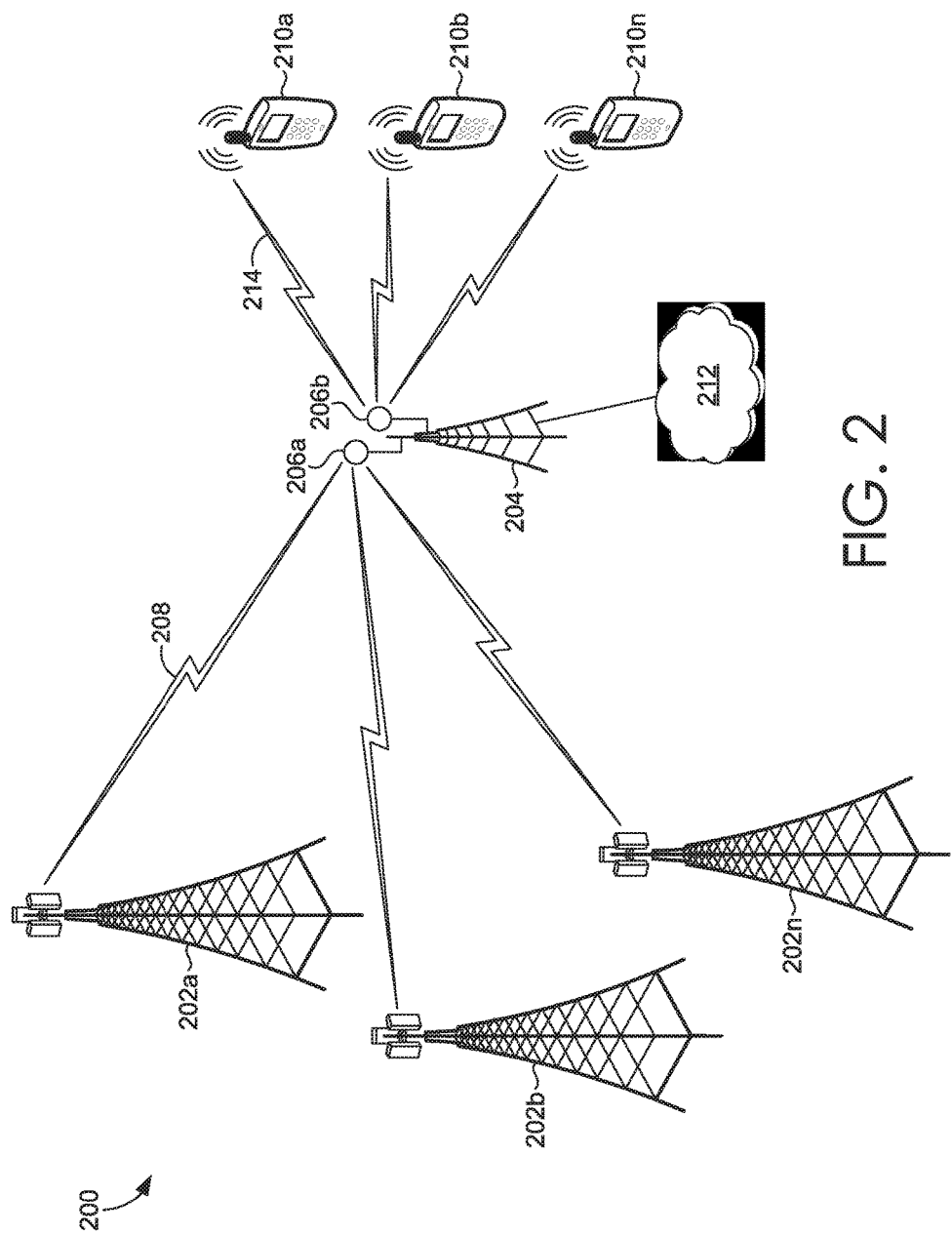
FIG. 2 is a diagram of an example network environment including a relay node, in accordance with some embodiments of the present disclosure.

Referring now to FIG. 2, a relay network 200 is depicted in accordance with embodiments of the technology described herein. Relay network 200 can include a plurality of base stations 202a, 202b, 202n, and one or more relay nodes 204. Relay node 204 can include one or more transmitting/receiving components 206a, 206b. Relay network 200 can be configured such that relay node 204 is in operable communication with one or more relay nodes 202a, 202b, 202n, via relay link 208. Further, relay node 204 can be in operable communication with UE 210a, 210b, 210n via access link 214. In this way, relay node 204 is in essence borrowing the signal from a base station 202a, 202b, 202n and providing connectivity to the UE 210a, 210b, 210n. According to some aspects, relay node 204 can scan an area having a plurality of base stations 202a, 202b, 202n to determine an optimal base station, for example a base station that provides optimal connectivity. For example, based on a scan, relay node 204 may determine one base station (e.g. base station 202a) is optimal and connect to that base station via relay link 208.

Figure 3:
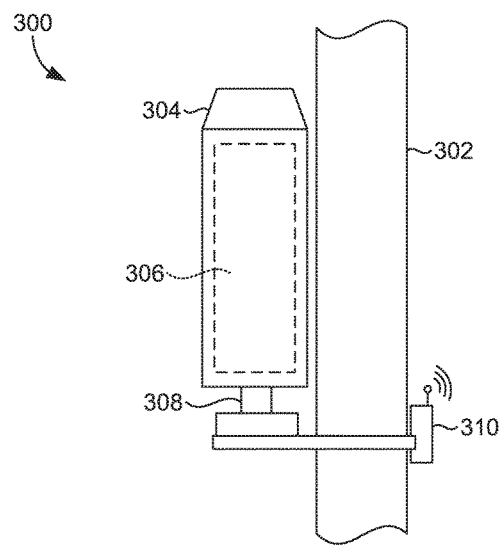
FIG. 3 is an exemplary hybrid relay antenna configuration, in accordance with some embodiments of the present disclosure.

Referring to FIG. 3, an exemplary relay antenna 300 (e.g. a hybrid relay antenna) is provided in accordance with an embodiment of the present disclosure. Relay antenna 300 can include an antenna assembly 304 comprising at least one antenna 306 (e.g. a switched beam antenna). The relay antenna assembly can further be communicatively coupled to a rotation mechanism 308, for example a rotatable motor. The antenna assembly 304 can include any number of antennas or antenna arrays, for example antenna assembly 304 can include two antennas 306, more specifically antenna assembly can include four antennas 306. Relay antenna 300 can be mounted on a relay station 302, such as a radio mast or tower, for example via a side-arm extension. In some aspects relay station 302 can include a separate access antenna 310 that is in operable communication with relay antenna 300. It will be understood that relay antenna and/or access antenna 310 can be connected to one or more servers or computing devices (e.g. 114 and 116 of FIG. 1) via a network. In this way control can be provided to the relay antenna 300, for example via rotatable motor 308. Further, data acquired by the relay antenna 300 (e.g. recognizable signals, measurements of one or more connected base stations) can be gathered, stored, and processed by any number of local or remote computing devices in communication with the relay antenna 300 via a network. It will be appreciated that any number of relay antennas and/or antenna assemblies can be attached to a relay station 302. As used herein, relay station can also refer to the collective antennas and other components attached to a radio tower or mounting device.

Figure 4:
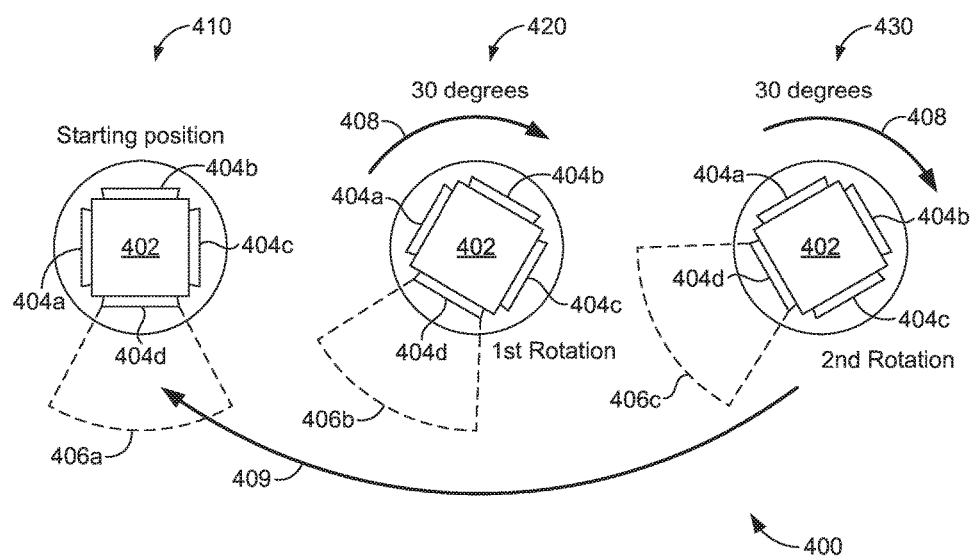
FIG. 4 is a schematic of an exemplary implementation of optimizing a relay node, in accordance with some embodiments of the present disclosure.

Referring to FIG. 4, a schematic of an exemplary implementation of optimizing a relay node 400 in a communications network is provided, in accordance with an embodiment of the present disclosure. A relay node can include one or more antenna assemblies 402, each antenna assembly comprising at least one antenna 404a, 404b, 404c, 404d. As illustrated, in some embodiments the antenna assembly 402 can have four antennas, for example two sets of two antennas positioned 90° from each other. In that example, the antenna assembly can have four beams, each covering a 90° sector of a complete 360° area. The antenna assembly can be operably coupled to a control element, such as a rotatable motor or any suitable rotation mechanism as discussed in conjunction with FIG. 3. Each antenna 404a, 404b, 404c, 404d of an antenna assembly can have an associated beamwidth that defines a beam area 406a, 406b, 406c. It will be appreciated that the beamwidth associated with an antenna 404a, 404b, 404c, 404d can be based on the antenna design. For example, an antenna can have a beamwidth of 30°, but other beamwidths are contemplated within the scope of the present disclosure. A Rotation Angle Increment can be determined for the antenna assembly based on the antenna beamwidth. In some embodiments the Rotation Angle Increment can be defined as:

$$\frac{1}{2}(\text{Antenna Beamwidth}) \qquad \text{Equation 1}$$

The Rotation Angle Increment will determine the number of degrees the antenna assembly is rotated to get from one position to a next position. Based on the determined Rotation Angle Increment, a number of rotational steps for the antenna assembly can be determined. The number of rotational steps will determine how many times or to how many positions the antenna assembly 402 is rotated to complete its scanning operations. Based on the number of rotational steps an antenna can scan the same number of areas. In some embodiments the number of rotational steps can be defined as:

$$\left[ \frac{360°}{\frac{\# \text{ of Beams}}{\text{Rotation Angle Increment}}} \right] - 1 \qquad \text{Equation 2}$$

Starting at a first position 410, each antenna 404a, 404b, 404c, 404d can then electronically switch and scan a respective first beam area, for example antenna 404d can scan first beam area 406a. During the scanning, an antenna 404a, 404b, 404c, 404d can take a plurality of measurements of one or more base stations recognized in the beam area. When an antenna electronically switches it can attach to and detach from the one or more base stations. Once the scanning at the first position is complete, the antenna assembly 402 can rotate to a second position 420 based on the determined Rotation Angle Increment 408 via the rotation mechanism. At the second position 430, each antenna 404a, 404b, 404c, 404d can electronically switch and scan a respective second beam area, for example antenna 404d can scan second beam area 406b. When the scanning is complete at the second position 420, the antenna assembly 402 can rotate to a third position 430 based on the Rotation Angle Increment 408 via the rotation mechanism. At the third position 430, each antenna 404a, 404b, 404c, 404d can electronically switch and scan a respective third beam area, for example antenna 404d can scan third beam area 406c. It will be appreciated that the antenna assembly can rotate to as many positions as determined by the number of rotational steps and an antenna will thus scan the same number of beam areas. Once scanning is completed for all positions, the antenna assembly 402 can rotate back to its initial position, or the first position 410 via the rotation mechanism. To accurately rotate back to the initial position, a Return Increment 409 can be determined for the antenna assembly 402. In some embodiments the Return Increment can be defined as:

$$\text{(Rotation Angle Increment)} \times \text{(Number of Rotational Steps)} \quad \text{Equation 3}$$

During the scanning operations, the relay node can compile a list of base stations based on measurements taken by any of the antennas as they electronically switch. In some embodiments, the relay node can dynamically update and order the list of base stations based on the measurements. Based on the list of base stations compiled from scanning all the beam areas (dictated by the determined Number of Rotational Steps), the relay node can determine an optimal alignment for the antenna assembly (i.e. the relay antenna). Once the optimal alignment is determined the relay node can rotate the antenna assembly to that position, and an antenna can connect or link to a base station (e.g. an optimal base station) for that alignment.

The following example is provided to illustrate the optimization of a relay node in accordance with the implementation discussed above in conjunction with FIG. 4. An antenna assembly (e.g. 402 of FIG. 4) is provided having at least one antenna, more specifically having four antennas (e.g. 404a, 404b, 404c, 404d of FIG. 4). By design, each antenna has an associated beamwidth, for example a beamwidth of 60°. It will be appreciated that any suitable antenna design is contemplated by the present disclosure and thus each antenna can have any number of beamwidths. Based on the beamwidth, a rotation angle increment can be determined. Given a beamwidth of 60°, utilizing Equation 1 above, a rotation angle increment of 30° is calculated. Subsequently, based on the calculated rotation angle increment, a number of rotational steps can be determined. In order to determine the number of rotational steps a coverage area for each antenna over a complete 360° coverage area is first calculated. In accordance with Equation 2 above, a coverage area of 90 is calculated for each antenna or beam of an antenna assembly having four antennas. Continuing with Equation 2, using the calculated rotation angle increment of 30°, a number of rotational steps of 2 is calculated. The number of rotational steps determines how many times or to how many positions the antenna assembly will rotate to in order to complete the required scanning operations.

Once the rotation angle increment and number of rotational steps are calculated (i.e. the control parameters) the scanning procedures or operations can begin. At its initial position (i.e. start position) each of the four antennas electronically switch to scan a respective first area (e.g. first beam area) for each antenna. During the scanning each antenna scans the beam area for one or more base stations and can record measurements or analyze each of the one or more base stations by individually attaching to each base station. For example, an antenna can attach to a first base station, take one or more measurements, detach from the first base station, and then attach to a second base station and so on. Once the first area scan is complete, each antenna (or collectively the beam assembly) rotates to a second position based on the determined rotation angle increment. In this example the antenna(s) rotate 30° in a clockwise or counterclockwise direction. The rotation direction as used here is merely a relative term, such that during scanning procedures the antenna(s) will complete subsequent rotations in the same direction. After the antenna(s) rotate to the second position the antenna(s) electronically switch to scan a respective second area (e.g. second beam area) for each antenna. When the second area scan is complete, each antenna (or collectively beam assembly) rotates another 30° in the same direction as the previous rotation to a third position based on the determined rotation angle increment. At the third position the antenna(s) electronically switch to scan a respective third area (e.g. third beam area) for each antenna. At this point in the present example the antenna(s) have completed two rotational steps, and as such the scanning portion is completed based on the number of rotational steps previously calculated. The antenna assembly then rotates back to its initial position in the opposite direction of the scanning rotations using a return increment based on Equation 3, in this example the return increment is 60°. As can be seen in this example, the complete 360° coverage area is scanned using two rotations to three separate positions. For an antenna assembly having four antennas, twelve scans or sets of measurements are completed over the course of the scanning operations.

Figure 5:
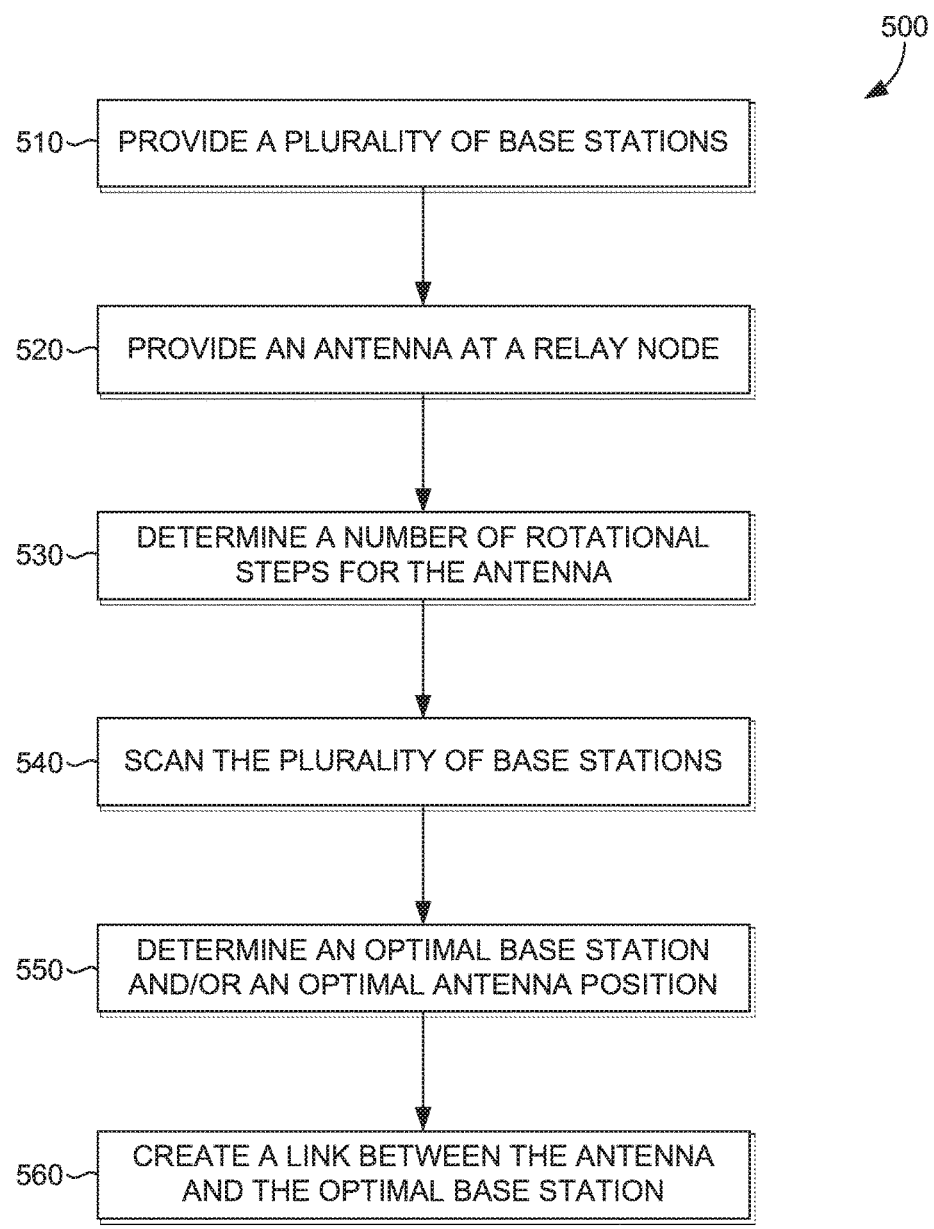
FIG. 5 is a flow diagram showing a method for providing an optimized relay node, in accordance with some embodiments of the present disclosure.

Referring to FIG. 5, a flow diagram of a method for providing an optimized relay node 500, or optimized relay antenna, is depicted. The optimized relay node can be implemented in a communications network such as a UE relay network (e.g. network 100 of FIG. 1 or network 200 of FIG. 2). At step 510, a plurality of base stations is provided (e.g. macro cell, eNodeB). At step 520, at least one antenna is provided at the relay node. The at least one antenna can be provided as an antenna assembly, such that the at least one antenna is communicatively coupled to a rotation mechanism, such as a rotatable motor. At step 530, a number of rotational steps can be determined for the at least one antenna. The number of rotational steps can be determined or calculated based on a determined rotation angle increment, the rotation angle increment determined or calculated from a beamwidth associated with the antenna. At step 540, the antenna can scan the plurality of base stations, for example by electronically switching, based on the determined number of rotational steps. The number of rotational steps can determine how many times or to how many positions an antenna needs to rotate in order to complete its scanning operations. Accordingly, an antenna can scan a first beam area at a first position, rotate to at least a second position to scan a second beam area, and so forth. In some embodiments the scanning operations can result in scanning a plurality of base stations in a 360° area. Once the scanning operations are completed, the antenna can rotate back to its initial position. Based on the scanning, at step 550 an optimal base station can be determined. For example, the optimal base station can be determined by a relay node based on measurements taken during the scanning operations. In some instances, the scanning operations can further include compiling a list of base stations, and an optimal base station can be determined from the list of base stations. In some embodiments, the relay node determines an optimal position for the antenna based on the scanning and/or list of base stations. At step 560, a link can be created between the antenna and any one of the base stations, for example the based station determined to be optimal. In some embodiments, the relay node can rotate the antenna based on the determined optimal position and then create a link between the antenna and a base station.

Figure 6:
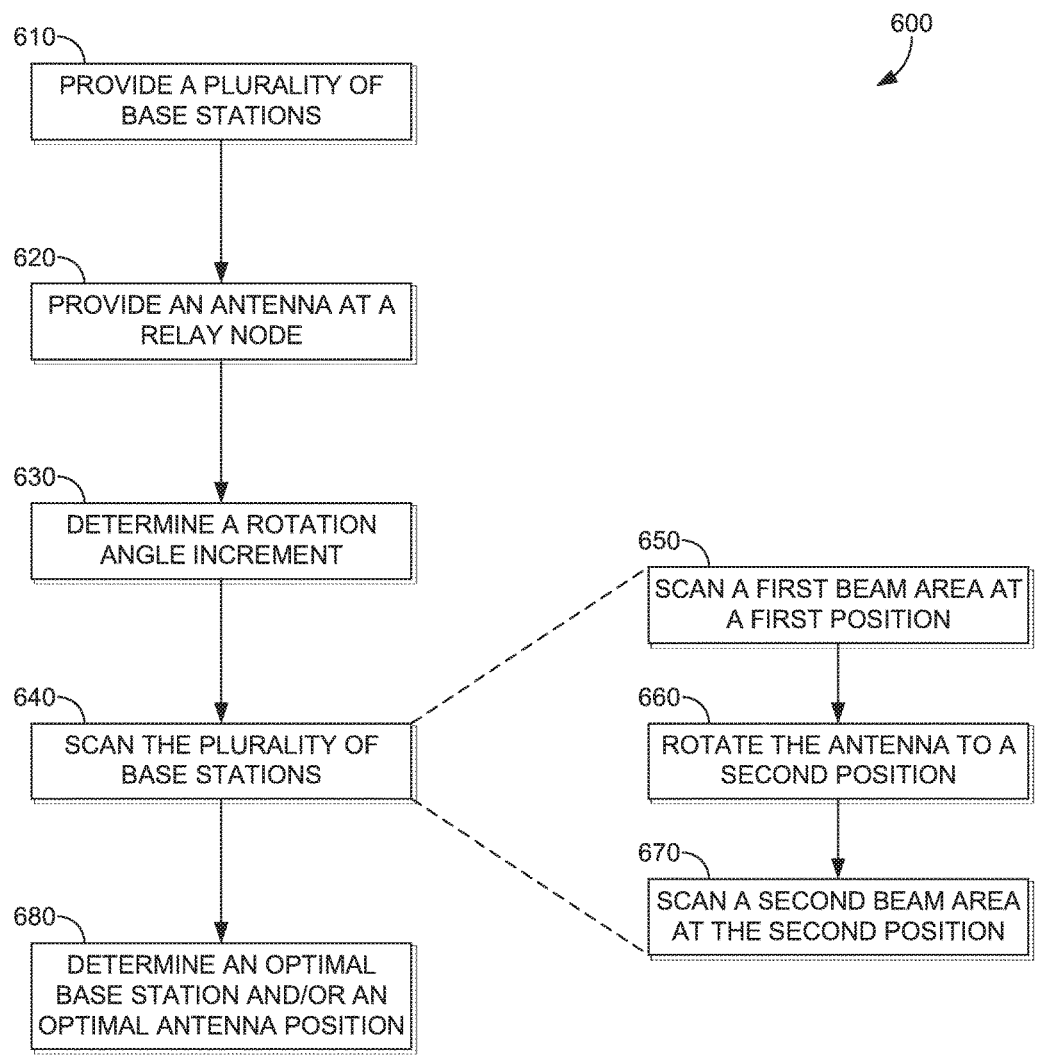
FIG. 6 is a flow diagram showing a method for optimizing a relay node in wireless communications networks, in accordance with some embodiments of the present disclosure.

Referring to FIG. 6 a flow diagram of a method 600 for optimizing a relay node in wireless communications networks is provided, for example in a UE relay network (e.g. network 100 of FIG. 1 or network 200 of FIG. 2). At step 610, a plurality of base stations is provided (e.g. macro cell, eNodeB). At step 620, at least one antenna (e.g. a switched beam, antenna) is provided at the relay node, the antenna having at least one beam, the beam being associated with a beamwidth. The antenna can be communicatively coupled to a rotation mechanism, such as a rotatable motor. At step 630, a Rotation Angle Increment is determined for the antenna, the Rotation Angle Increment calculated based on the beamwidth associated with the antenna. Further, based on the determined Rotation Angle Increment, a Number of Rotational Steps can be determined or calculated for the antenna as well. Even further, based on the Rotation Angle Increment and/or the Number of Rotational Steps, a number of scan positions for the antenna can be determined. At step 640 the antenna scans the plurality of base stations. The scanning, by the antenna, can be done by employing any number of scanning steps or procedures. At step 650, the antenna scans a first beam area at a first position by electronically switching. During scanning, the antenna can, for example, connect to and subsequently disconnect from any number of base stations within the beam area. In this way the antenna can take measurements of any of the base stations within the beam area and gather and store data associated with the base stations. After completing the scan of the first beam area, at step 660 the antenna rotates to a second position by rotating the number of degrees of the rotation angle increment. At step 670, the antenna scans a second beam area at the second beam position by electronically switching. In various embodiments, the antenna will continue to rotate and scan until each of the determined number of scan positions has been scanned. Based on the scanning of at least the first beam area and the second beam area, at step 680 an optimal base station is determined from the plurality of base stations. Then antenna can then connect to the determined optimal base station. In some instances, based on the determined optimal base station, the antenna will rotate or adjust before connecting to the base station, and in this way an optimal antenna position can be determined. In some embodiments, the optimal base station and or optimal antenna position can be determined based on a list of base stations created during the scanning. The list of base stations can be dynamically updated during the scanning and can further be stored locally (e.g. in the local memory of a computing device connected to the antenna) or remotely (e.g. in the storage of a remote server connected to the antenna).

Embodiments of the technology described herein may be embodied as, among other things, a method, a system, or a computer-program product. Accordingly, the embodiments may take the form of a hardware embodiment, or an embodiment combining software and hardware. The present technology may take the form of a computer-program product that includes computer-useable instructions embodied on one or more computer-readable media. The present technology may further be implemented as hard-coded into the mechanical design of network components and/or may be built into a broadcast cell or central server.

Computer-readable media includes both volatile and nonvolatile, removable and non-removable media, and contemplate media readable by a database, a switch, and/or various other network devices. Network switches, routers, and related components are conventional in nature, as are methods of communicating with the same. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and/or other magnetic storage devices. These memory components may store data momentarily, temporarily, and/or permanently, and are not limited to the examples provided.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 7:
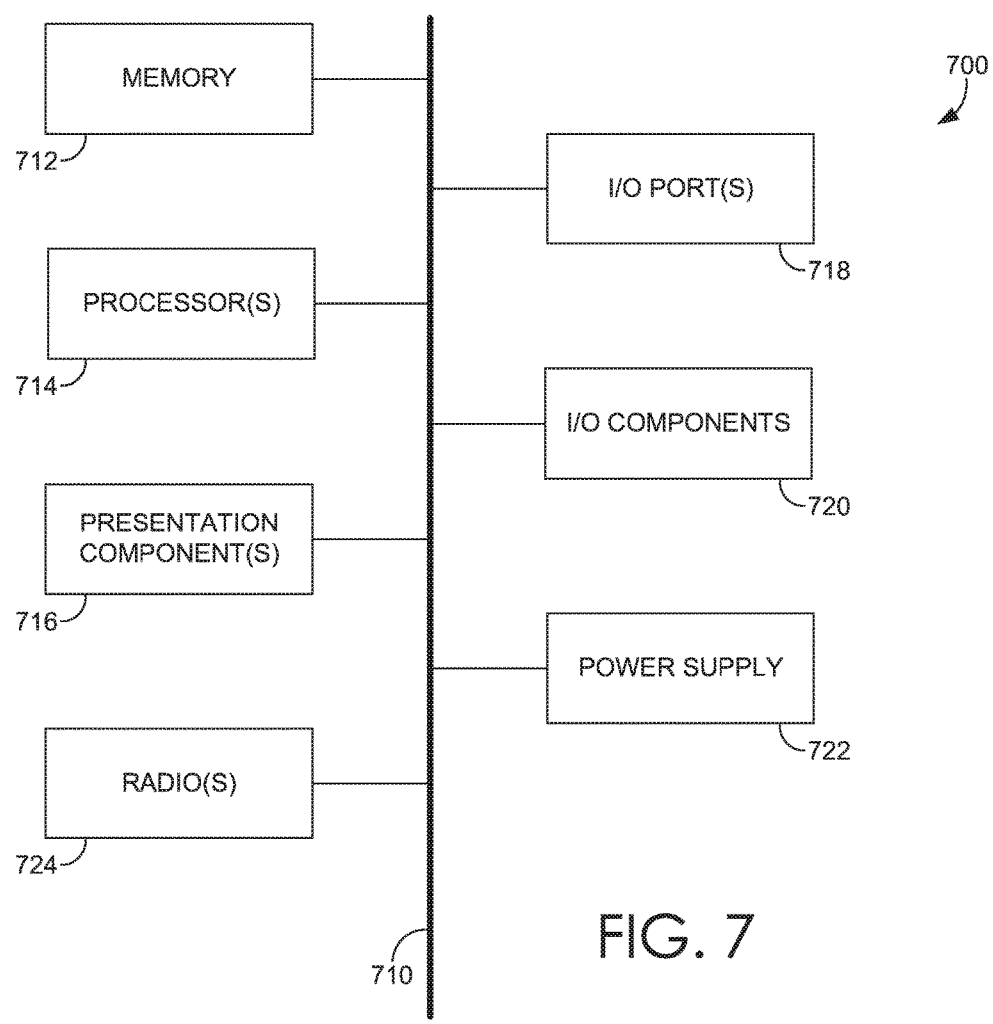
FIG. 7 is a block diagram of an exemplary computing environment suitable for use in implementing embodiments of the present disclosure.

Referring to FIG. 7, a block diagram of an exemplary computing device 700 suitable for use in implementations of the technology described herein is provided. In particular, the exemplary computer environment is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated. It should be noted that although some components in FIG. 7 are shown in the singular, they may be plural. For example, the computing device 700 might include multiple processors or multiple radios. As shown in FIG. 7, computing device 710 includes a bus 710 that directly or indirectly couples various components together, including memory 712, processor(s) 714, presentation component(s) 716 (if applicable), radio(s) 724, input/output (I/O) port(s) 718, input/output (I/O) component(s) 720, and power supply(s) 722. Although the components of FIG. 7 are shown with lines for the sake of clarity, in reality, delineating various components is not so clear, and metaphorically, the lines would more accurately be grey and fuzzy. For example, one may consider a presentation component such as a display device to be one of I/O components 720. Also, processors, such as one or more processors 714, have memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 712 may take the form of memory components described herein. Thus, further elaboration will not be provided here, but it should be noted that memory 712 may include any type of tangible medium that is capable of storing information, such as a database. A database may be any collection of records, data, and/or information. In one embodiment, memory 712 may include a set of embodied computer-executable instructions that, when executed, facilitate various functions or elements disclosed herein. These embodied instructions will variously be referred to as "instructions" or an "application" for short.

Processor 714 may actually be multiple processors that receive instructions and process them accordingly. Presentation component 716 may include a display, a speaker, and/or other components that may present information (e.g., a display, a screen, a lamp (LED), a graphical user interface (GUI), and/or even lighted keyboards) through visual, auditory, and/or other tactile cues.

Radio 724 represents a radio that facilitates communication with a wireless telecommunications network. Illustrative wireless telecommunications technologies include CDMA, GPRS, TDMA, GSM, and the like. Radio 724 might additionally or alternatively facilitate other types of wireless communications including Wi-Fi, WiMAX, LTE, or other VoIP communications. As can be appreciated, in various embodiments, radio 724 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 718 may take a variety of forms. Exemplary I/O ports may include a USB jack, a stereo jack, an infrared port, a firewire port, other proprietary communications ports, and the like. Input/output (I/O) components 720 may comprise keyboards, microphones, speakers, touchscreens, and/or any other item usable to directly or indirectly input data into the computing device 700.

Power supply 722 may include batteries, fuel cells, and/or any other component that may act as a power source to supply power to the computing device 722 or to other network components, including through one or more electrical connections or couplings. Power supply 722 may be configured to selectively supply power to different components independently and/or concurrently.

Many variations can be made to the illustrated embodiments of the present invention without departing from the scope of the present invention. Such modifications are within the scope of the present invention. Embodiments presented herein have been described in relation to particular embodiments which are intended in all respects to be illustrative rather than restrictive. Alternative embodiments and modifications would be readily apparent to one of ordinary skill in the art, but would not depart from the scope of the present invention.

From the foregoing it will be seen that this invention is one well adapted to attain all ends and objects hereinabove set forth together with the other advantages which are obvious and which are inherent to the structure. It will be understood that certain features and sub combinations are of utility and may be employed without reference to other features and sub combinations. This is contemplated by and is within the scope of the invention.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

What is claimed is:

1. A system for optimizing a wireless communications network, the system comprising:
    a plurality of base stations; and
    a relay node, the relay node comprising an antenna coupled to a rotatable motor,
    wherein the relay node is configured to automatically adjust the antenna, via the rotatable motor, based on at least one calculated rotational step to determine an optimal backhaul link to at least one of the plurality of base stations, the at least one calculated rotational step associated with a particular scanning area.

2. The system of claim 1, wherein the relay node is configured to adjust the antenna based on at least one rotation angle increment.

3. The system of claim 1, wherein the relay node determines the optimal backhaul link based on at least one scan of at least one beam area.

4. The system of claim 3, wherein the relay node compiles a list of base stations based on the at least one scan and the relay node determines the optimal backhaul link based on the list of base stations.

5. A method for providing an optimized relay node in wireless communications networks, the method comprising:
    providing a plurality of base stations;
    providing at least one antenna at a relay node, the at least one antenna communicatively coupled to a rotatable motor;
    determining a number of rotational steps for the at least one antenna, each rotational step associated with a particular scanning area;
    scanning, by the at least one antenna, the plurality of base stations based on the determined number of rotational steps;
    determining that at least one of the base stations of the plurality of base stations is optimal to maximize at least wireless throughput; and
    creating a link between the at least one antenna and the at least one base station based on the scanning.

6. The method of claim 5, further comprising determining a rotation angle increment for the at least one antenna, wherein the number of rotational steps is based on the rotation angle increment.

7. The method of claim 6, wherein the rotation angle increment is based on a beamwidth of the at least one antenna.

8. The method of claim 6, wherein the scanning comprises rotating the antenna from a first position to at least a second position, the rotating based on the rotation angle increment.

9. The method of claim 8, wherein the one or more positions are determined by the number of rotational steps.

10. The method of claim 5, wherein the scanning comprises electronically switching the antenna at one or more positions.

11. The method of claim 5, wherein the scanning comprises compiling a list of base stations based on measurements taken by the at least one antenna.

12. The method of claim 11, wherein the determining that at least one of the base stations of the plurality of base stations is optimal is derived from the list of base stations.

13. A method for optimizing a relay node in wireless communications networks, the method comprising:
providing a plurality of base stations;
providing an antenna having at least one beam at a relay node, the antenna communicatively coupled to a rotatable motor, wherein the antenna is a switched beam antenna;
calculating a rotation angle increment for the antenna to determine a number of antenna scan positions;
scanning, by the antenna, the plurality of base stations, the scanning comprising:
scanning a first beam area by electronically switching the antenna at a first position;
rotating the antenna to a second position;
scanning a second beam area by electronically switching the antenna at the second position; and
determining an optimal base station from the plurality of base stations based on at least the scanning of the first beam area and the second beam area.

14. The method of claim 13, further comprising:
rotating the antenna to a third position; and
scanning a third beam area by electronically switching the antenna at the third position.

15. The method of claim 13, wherein the antenna is rotated by the rotation angle increment.

16. The method of claim 13 further comprising determining a number of rotational steps based on the rotation angle increment.

17. The method of claim 16, wherein the scanning is based on the number of rotational steps.

18. The method of claim 13, wherein determining the rotation angle increment is based on an antenna beamwidth associated with the antenna.

19. The method of claim 13, wherein the scanning comprises compiling a list of base stations based on one or more measurements taken by the antenna.

20. The method of claim 19, wherein determining the optimal base station is derived from the list of base stations.

* * * * *